(12) United States Patent
Oroskar et al.

(10) Patent No.: US 8,363,622 B1
(45) Date of Patent: Jan. 29, 2013

(54) MOBILE-STATION-INITIATED REMOVAL OF A HIGH-CONGESTION SECTOR FROM THE ACTIVE SET

(75) Inventors: Siddharth Oroskar, Overland Park, KS (US); Srikanth Pulugurta, Overland Park, KS (US); Maulik Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 361 days.

(21) Appl. No.: 12/756,041

(22) Filed: Apr. 7, 2010

(51) Int. Cl.
*H04W 4/00* (2009.01)
*G08C 17/00* (2006.01)
*H04W 36/00* (2009.01)

(52) U.S. Cl. ......... 370/332; 370/331; 455/434; 455/437

(58) Field of Classification Search .................. None
See application file for complete search history.

(56) References Cited

U.S. PATENT DOCUMENTS

| | | | |
|---|---|---|---|
| 5,577,022 A | 11/1996 | Padovani et al. | |
| 5,999,522 A | 12/1999 | Rohani | |
| 6,058,136 A | 5/2000 | Ganesh et al. | |
| 6,160,999 A | 12/2000 | Chheda et al. | |
| 6,317,453 B1 | 11/2001 | Chang | |
| 6,603,971 B1 | 8/2003 | Mohebbi | |
| 6,606,497 B2 | 8/2003 | Mohebbi | |
| 6,960,939 B2 | 11/2005 | Ngo | |
| 7,050,804 B1 | 5/2006 | Wurtenberger et al. | |
| 7,076,265 B2 | 7/2006 | Tayloe et al. | |
| 7,302,265 B1 | 11/2007 | Chalishazar et al. | |
| 7,529,546 B1 | 5/2009 | Sigg | |
| 2002/0049058 A1 | 4/2002 | Tee | |
| 2002/0119787 A1 | 8/2002 | Hunzinger | |
| 2002/0142772 A1 | 10/2002 | Hunzinger | |
| 2003/0186707 A1 | 10/2003 | Pihl et al. | |
| 2003/0195017 A1 | 10/2003 | Chen et al. | |
| 2005/0020203 A1 | 1/2005 | Losh et al. | |
| 2005/0164709 A1* | 7/2005 | Balasubramanian et al. | 455/453 |
| 2006/0135173 A1 | 6/2006 | Vannithamby | |
| 2006/0159051 A1 | 7/2006 | English | |
| 2006/0227744 A1 | 10/2006 | Metke et al. | |
| 2008/0076432 A1 | 3/2008 | Senarath et al. | |
| 2009/0046665 A1 | 2/2009 | Robson et al. | |

OTHER PUBLICATIONS

Unpublished U.S. Appl. No. 12/725,294, filed Mar. 16, 2010 entitled "Uniform Reverse-Link Power Control for an Active Set of a Mobile Station".
Unpublished U.S. Appl. No. 12/605,457, filed Oct. 26, 2009 entitled "Intelligent Power Control in a Wireless Network".
Office Action mailed Oct. 16, 2008 in U.S. Appl. No. 11/265,433, filed Nov. 1, 2005.
Scott Baxter, "Course 132 Technical Introduction to CDMA, IS-95 CDMA and a few details of CDMA 2000 1X", available at www.howcdmaworks.com (Feb. 2003).

* cited by examiner

*Primary Examiner* — Clemence Han

(57) ABSTRACT

Exemplary methods and systems may be used by a mobile station to request that a sector be removed from its active set, and by a radio access network (RAN) to facilitate such a request. An exemplary method involves (a) a mobile station receiving a congestion indicator in each active sector of an active set of the mobile station, wherein the congestion indicators are received from a RAN; (b) the mobile station using the received congestion indicators as a basis for selecting at least one high-congestion sector from the active set; and (c) the mobile station providing an indication of the at least one high-congestion sector to the RAN. Further, the mobile station may perform steps (b)-(c) in response to a determination that the battery power for the mobile station is below the threshold level.

20 Claims, 7 Drawing Sheets

| CONGESTION INDICATOR | PCO (%) |
|---|---|
| 00 | 0-25% |
| 01 | 25-50% |
| 10 | 50-70% |
| 11 | 70-100% |

FIG. 4B

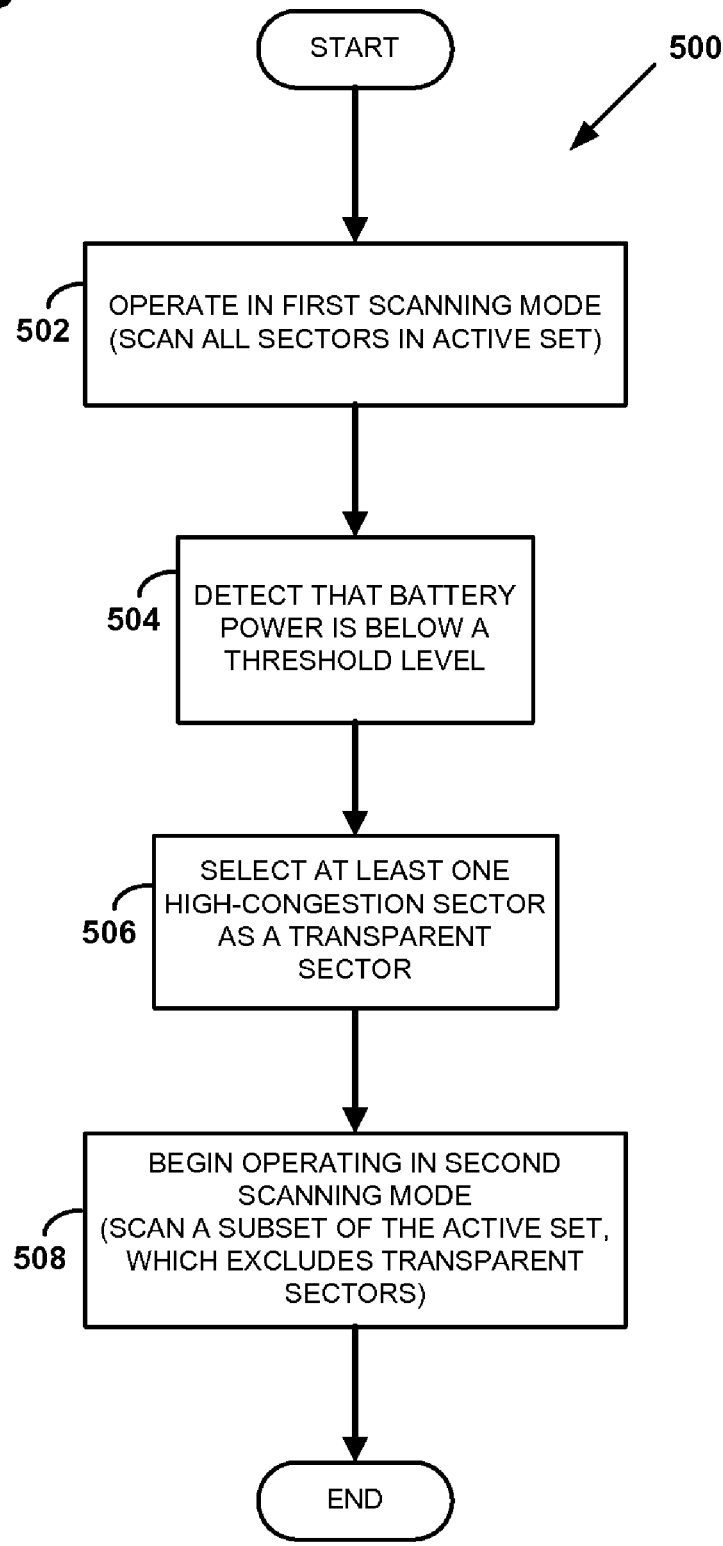

MOBILE-STATION-INITIATED REMOVAL OF A HIGH-CONGESTION SECTOR FROM THE ACTIVE SET

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Mobile stations operating in such systems may be capable of communication with either or both protocols, and may further be capable of handing off between them, in addition to being able to hand off between various configurations of coverage areas.

OVERVIEW

In CDMA systems, such as those compliant with IS-2000, a mobile station can communicate on a given carrier frequency with a number of "active" sectors concurrently, which collectively make up the mobile station's "active set." To create its active set, a mobile station typically scans for available pilot signals and populates the active set with sectors having a pilot signal above a threshold level. Under IS-2000, a mobile station continually scans the pilot signals from its active sectors as well as from other sectors, as the signal strength in each sector may vary as the mobile station moves about within the wireless communication system, or as other factors cause radio frequency (RF) conditions to change. The mobile station then reports the received signal strengths to the serving base station, which in turn directs the mobile station to update its active set in accordance with the reported strengths and one or more threshold conditions.

The active set is typically maintained in the mobile station's memory, each active sector being identified according to its PN offset. Depending on the system, the number of active sectors can be up to six (currently). In practice, during a call, a mobile station typically communicates with all active sectors concurrently (receiving largely the same signal from each active sector), and on a frame-by-frame basis, selects the best signal to use.

Since, during a call, a mobile station communicates on all its active sectors, the more sectors in the active set, the more power a mobile consumes during the call. Accordingly, exemplary methods and systems may be employed to help a mobile station conserve power, for instance, by detecting when the mobile station's battery power drops below a threshold, and requesting that the radio access network (RAN) remove at least one high-congestion sector from the mobile station's active set. Further, from the perspective of the RAN, reducing the number of sectors in the active set may free up network resources, which may be particularly beneficial in a congested sector. For example, reducing the number of active sectors may free up soft hand-off resources such as channel elements and Walsh Codes for use in communicating with other mobile stations.

Further, the continual scanning of the active set by a mobile station also drains the mobile stations battery. Accordingly, exemplary methods and systems may be employed to help a mobile station conserve power, for instance, by selecting at least one active sector as a "transparent" sector, which remains in the active set, but is not scanned by the mobile station. The mobile station rests (i.e. powers down) when it would have otherwise been scanning a transparent sector, which may help to preserve battery life.

In one aspect, an exemplary method involves: (a) a mobile station receiving a congestion indicator in each active sector of an active set of the mobile station, wherein the congestion indicators are received from a radio access network (RAN); (b) the mobile station using the received congestion indicators as a basis for selecting at least one high-congestion sector from the active set; and (c) the mobile station providing an indication of the at least one high-congestion sector to the RAN.

The method may further involve the mobile station making a determination that battery power for the mobile station is below a threshold level. The mobile station may then perform steps (b)-(c) in response to the determination that the battery power for the mobile station is below the threshold level. Alternatively, the mobile station may determine that it is substantially stationary, and perform steps (b)-(c) in response to this determination.

In a further aspect, another exemplary method involves: (a) a radio access network (RAN) transmitting a congestion indicator in each of a plurality of sectors, wherein the plurality of sectors includes one or more active sectors from an active set of a mobile station; (b) the RAN receiving from the mobile station, an indication of at least one high-congestion sector from the active set, wherein the at least one high-congestion sector has been selected based at least in part on the congestion indicators in the active sectors; and (c) the RAN determining whether to remove the at least one high-congestion sector from the active set.

In an exemplary embodiment the RAN may determine the congestion indicator in each sector using at least one of: (a) the paging channel occupancy (PCO) in the sector, (b) the access channel occupancy (ACO) in the sector, and (c) Walsh-code usage on forward-link in the sector. The RAN may then send the congestion indicators in each sector via the overhead messaging in the paging channel and/or traffic channels.

The step of determining whether to remove the at least one high-congestion sector from the active set may involve the RAN comparing a congestion level in the high-congestion sector to a threshold level of congestion. Then, if the congestion level in the high-congestion sector is greater than the threshold level, the RAN may remove the high-congestion sector from the active set. Alternatively, the RAN may automatically remove the high-congestion sector from the active set, in response to receiving the indication of the at least one high-congestion sector.

In a further aspect, an exemplary system includes: (i) a tangible computer-readable medium; and (ii) program instructions stored in the tangible computer-readable medium that, when executed by a processor, cause a mobile station to: (a) receive a congestion indicator in each active sector of an active set of the mobile station, wherein the congestion indicators are received from a radio access network (RAN); (b) use the received congestion indicators as a basis to select at least one high-congestion sector from the active set; and (c) provide an indication of the at least one high-congestion sector to the RAN. Further, the system may perform steps (b)-(c) in response to the determination that the battery power of the mobile station is below the threshold level.

And in a further aspect, another exemplary method involves: (a) a mobile station initially operating in a first scanning mode, wherein operation in the first scanning mode comprises the mobile station scanning all active sectors in an active set of the mobile station; (b) the mobile station receiving a congestion indicator for each active sector in an active set of the mobile station, wherein the congestion indicators are received from a radio access network (RAN), and wherein each received congestion indicator indicates a level of congestion in the corresponding active actor; (c) the mobile station selecting at least one high-congestion sector as a transparent sector, the selected high-congestion sector having the highest level of congestion relative to the other active sectors; and (d) the mobile station operating in a second scanning mode, wherein operation in the second scanning mode comprises the mobile station scanning a subset of the sectors in the active set, wherein the subset excludes the one or more transparent sectors.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 4B is a table showing exemplary congestion indicator values when a 2-bit congestion indicator is employed, according to an exemplary embodiment;

FIG. 5 is another flow chart illustrating a method, according to an exemplary embodiment.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
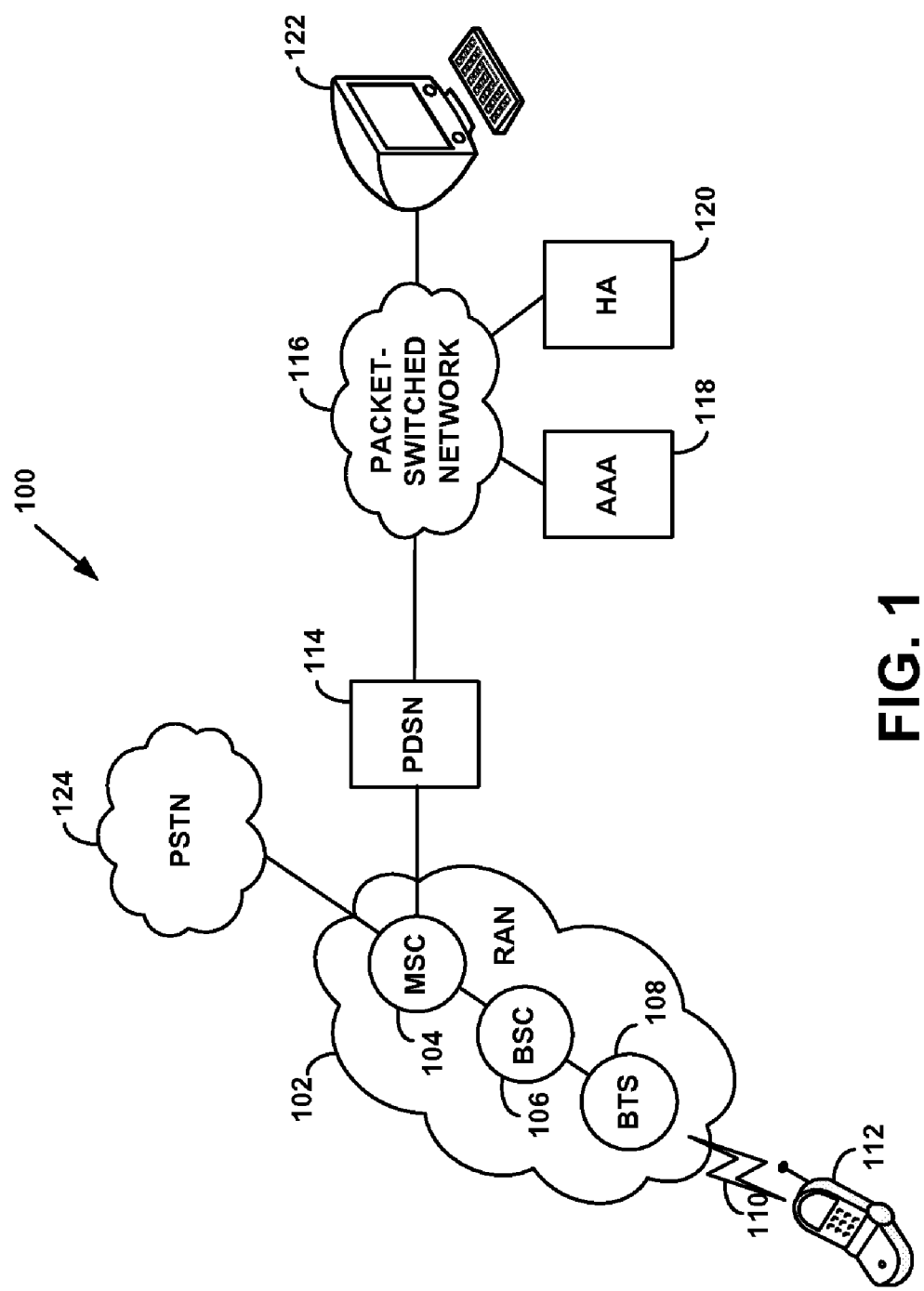
FIG. 1 is a simplified block diagram of a wireless communication system in which an exemplary embodiment may be implemented.

Referring to the drawings, FIG. 1 is a simplified block diagram of a wireless communication system 100 in which an exemplary embodiment may be implemented. In such a wireless communication system, a wireless carrier typically operates a radio access network (RAN) 102, which is controlled by a switching entity such as a mobile switching center (MSC) 104. The MSC generally includes or connects with one or more base station controllers (BSCs) 106, which in turn connect with one or more base transceiver stations (BTSs) 108. Each BTS 108 conventionally includes a cell tower with one or more antennas that communicate with mobile stations 112, 113, 115 via an air interface 110.

Communications between the RAN 102 and mobile stations 112, 113, 115 may occur in accordance with any air interface protocol now known or later developed. Examples of such protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed.

With the illustrated configuration, RAN 102 may provide service in an area that is divided geographically into a number of cells, each defined by a radio frequency (RF) radiation pattern from a BTS 108. Furthermore, each cell may be subdivided into a number of sectors. For simplicity, references to a "sector" herein should be understood to include sectors, cells, and possibly other types of coverage areas as well. In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Further, air interface communications between mobile station 112 and BTS 108 may be classified as forward link communications, which are those passing from BTS 108 to the mobile station 112, and reverse link communications, which are those passing from mobile station 112 to BTS 108. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

As shown, BSC 106 may function to control one or more BTSs, such as BTS 104, and to provide those one or more BTSs with connections to switches, such as MSC 104 or packet-data serving node (PDSN) 114, for instance. PDSN 114 in turn provides connectivity with a packet-switched network 116, such as the Internet and/or a wireless carrier's private core packet-network. Sitting as nodes on network 116 are, by way of example, an authentication, authorization, and accounting (AAA) server 118, a mobile-IP home agent (HA) 120, and a remote computer 122. After acquiring an air traffic channel over its air interface, a mobile station (e.g., mobile station 112) may send a request to PDSN 116 for a connection in the packet data network. Then, following authentication of the mobile station by AAA server 118, the mobile station may be assigned an IP address by the PDSN or by HA 120, and may thereafter engage in packet-data communications with entities such as remote computer 122.

MSC 104 may be any networking element arranged to carry out the switch functions described herein. Thus, MSC 104 may include a communication interface, a processor, and data storage comprising instructions executable by the processor to carry out those switch functions. The communication interface may include one or more wired (e.g. Ethernet) and/or wireless (e.g. WiFi or WiMax) interfaces for communicating with at least BSC 106 and a public-switched telephone network (PSTN) 124.

Note that the combination of BTS 108 and BSC 106 may be considered a "base station." However, BTS 108 or BSC 106 could, taken alone, each be considered a base station as well. Furthermore, a base station may be considered to be either or both of those devices, and perhaps make use of one or more functions provided by MSC 104, and/or other network entities.

In an exemplary embodiment, RAN 102 (e.g., BTS 108, BSC 106, and/or MSC 104) may be configured to determine a congestion indicator for a given sector, and to provide the congestion indicator to mobile stations operating in the sector. The congestion indicator may be indicative of forward-link congestion, reverse-link congestion, or of both forward-link and reverse-link congestion. For example, on the forward link, the paging-channel occupancy (PCO) in a sector may be used to determine the congestion indicator for that sector. As another forward-link example, the Walsh-code usage (i.e., the number or percentage of Walsh codes that are in use) may be used to determine the congestion indicator for the sector. Additionally or alternatively, on the reverse link, the access-channel occupancy (ACO) in a sector may be used to determine the congestion indicator for that sector. Techniques for determining the PCO and the ACO are well known in the art, and thus not discussed further herein.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Referring now to mobile station 112, it may be any mobile device arranged to carry out the mobile-station functions described herein. As examples, mobile station 112 could be or include a cell phone, a PDA, a computer, a laptop computer, a hybrid CDMA/EV-DO device, and/or a multi-mode cellular/Wi-Fi device. As such, a mobile station may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs. Further, while the term "mobile station" is a term of art commonly used for such devices, the term "mobile station" should be understood to include non-mobile devices, such as a personal computer or any other device capable of the functionality of a mobile station described herein.

In an exemplary embodiment, mobile station 112 may be configured to maintain an "active set" of sectors with which the mobile station is in communication. For example, under IS-2000, the base station provides the mobile station the following parameters, which relate to pilot signal strength and are used by the mobile station to maintain its active set:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The base station also provides the mobile station with a Neighbor List Update Message (NLUM), which identifies the "neighbor" sectors, which are not in the active set, but are identified as candidates for the active set.

The mobile station 112 then scans for all of the pilot signals from the sectors in its active set, and measures the received signal strength for each. For example, mobile station 112 may calculate $E_c/I_o$ for each sector in the active set, where $E_c$ is energy per chip and $I_o$ is the total power received. If the pilot signal strength of any neighbor sector exceeds T_ADD, the mobile station 112 adds the pilot to its "candidate" set and sends a Pilot Strength Measurement Message (PSMM) to the base station with the estimated $E_c/I_o$ for the pilot and information indicative of the identity of the sector. Further, if the pilot strength exceeds the strength of any active-sector signal by T_COMP, and depending on current capacity and other issues, the base station may then send a Handoff Direction Message (HDM) to the mobile station, listing the pilot as a new member of the active set. Upon receipt of the HDM, the mobile station 112 then adds the pilot to its active set as instructed, and the mobile station sends a Handoff Completion Message (HCM) to the base station (e.g., to BTS 108), acknowledging the instruction, and providing a list of the pilots (PN offsets) in its active set. Depending on system configuration, the mobile station may also identify pilot signals from the remaining set of sectors if they exceed the thresholds.

Similarly, if the mobile station 112 detects that the signal strength of a pilot in its active set drops below T_DROP, the mobile station starts a handoff drop timer. If T_TDROP passes, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

When the mobile station 112 is engaged in IS-2000 communications, mobile station 112 decodes transmissions using all the PN offsets in its active set, together with the respective Walsh codes assigned for each PN-identified sector. Then, on a frame-by-frame basis, the mobile station may select a sector from its active set from which to receive forward-link traffic.

Figure 2:
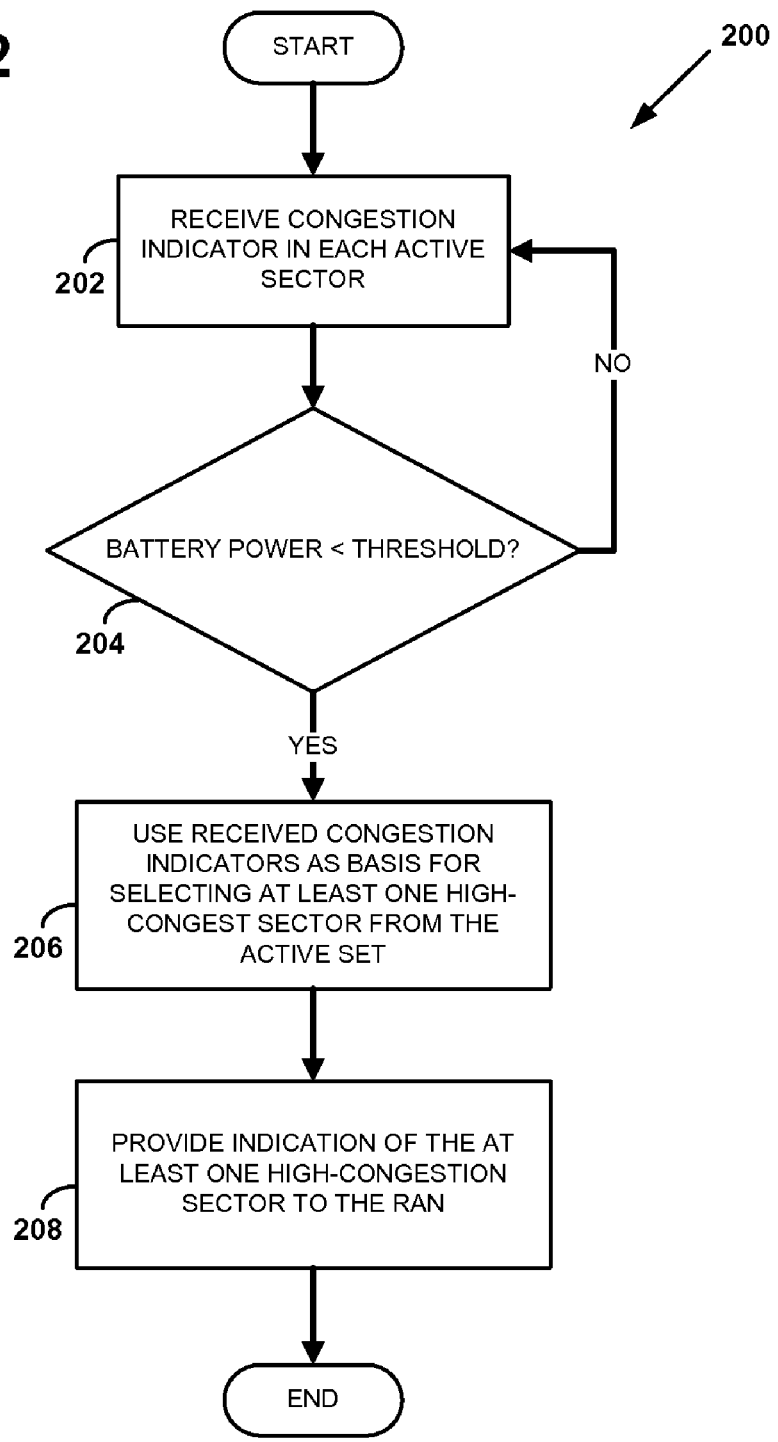
FIG. 2 is a flow chart illustrating a method, according to an exemplary embodiment.

FIG. 2 is a flow chart illustrating a method 200, according to an exemplary embodiment. The method 200 involves a mobile station receiving a congestion indicator in each active sector of the mobile station's active set, as shown by block 202. The mobile station also makes a determination that the battery power for the mobile station is below a threshold level, as shown in block 204. Then, in response to this determination, the mobile station uses the received congestion indicators as a basis for selecting at least one high-congestion sector from the active set, as shown by block 206, and provides an indication of the at least one high-congestion sector to the RAN, as shown by block 208.

The mobile station preferably receives the congestion indicators in overhead messages from the RAN. For instance, the mobile station may obtain the congestion indicator from a congestion field included in an overhead message broadcast via the paging channel. As another example, the mobile station may obtain the congestion indicator via the traffic channel, such as in a congestion field included in an HDM from the RAN. In an exemplary embodiment, the mobile station may periodically receive a congestion indicator in each active sector via the respective paging channel, while it is not engaged in a communication. Further, while engaged in a communication, the mobile station may receive updated congestion indicators in each active sector via HDMs. More generally, it should be understood that the mobile station may receive congestion indicators for the active sectors from any source, and in any format, without departing from the scope of the invention.

Method 200 involves the mobile station performing the functions shown in blocks 206 and 208 in response to determining that its battery power has dropped below a threshold level. This threshold may be selected as a matter of engineering design choice. Furthermore, it should be understood that the mobile station may perform blocks 206 and 208 for a reason other than low battery power. For example, a mobile station may detect when it substantially stationary, such as by periodically using GPS to determine its location or detecting when it has been communicating via the same sector for a predetermined time, and responsively select a high-congestion sector. More generally, the mobile station may select and provide the RAN with a high-congestion sector for any reason, without departing from the scope of the invention.

The implementation of the step of using the received congestion indicators to select a high-congestion sector may vary, depending on the format of the congestion indicators. Generally, a congestion indicator of any format indicates a relative level of congestion in the active actor to which it corresponds. Accordingly, the congestion indicators may be used to rank the active sectors in terms of congestion level, and the active sector having the highest relative level of congestion may be selected as the high-congestion sector.

To identify the high-congestion sector for the RAN, the mobile station may send an Active Sector Removal Request (ASR-Request) to the RAN via the reverse-link traffic channel. For instance, in an exemplary embodiment, the mobile station may send an Active Sector Removal Request (ASR-Request) to the RAN. The ASR-Request is preferably included in an existing message such as a PSMM, or alternatively may be sent as a separate message. The ASR-Request may identify the sector to be removed, such as by adding a remove-bit in a PSMM that identifies a high-congestion sector, and/or by indicating the PN offset of the high-congestion sector. The ASR-Request may include other information and data as well. Alternatively, rather, ASR-Request may take the form of a PSMM that simply excludes the high-congestion sector, so that it will not be included in the active set when the RAN responds with an HDM.

In a further aspect, the ASR-Request may also include a priority indicator. For example, the RAN may perform further analysis to determine whether removal of a high-congestion sector from the active set is appropriate. The priority indicator may then be used by the mobile station to indicate that the RAN should effectuate the ASR-Request and remove the high-congestion sector, regardless of any further analyses by the RAN, or alternatively, to indicate that the RAN should favor removal more than it otherwise would when evaluating whether to remove the high-congestion sector. In an exemplary embodiment, the priority indicator may take the form of a priority bit that is set to "1" to indicate ASR-Request is a priority request.

In an alternative embodiment, to implement a priority indicator, a mobile station may define two thresholds for its battery power—a standard threshold and a lower "priority" threshold. When the battery power drops below the standard threshold, the mobile station may then send a non-priority ASR-Request, with a priority bit set to "0", thus allowing the RAN to further evaluate whether to remove the high-congestion sector identified in the ASR-Request. Then, when the battery power drops below the priority threshold, the mobile station may send a priority ASR-Request, with the priority bit set to "1", which instructs the RAN to remove the high-congestion sector, regardless of any other factors the RAN might consider.

In other embodiments, the mobile station may only employ only one battery-power threshold. As such, the mobile station may periodically send non-priority ASR-Requests, unrelated to any particular state of its battery. For instance, the mobile station may include an ASR-Request in each HCM it sends. On the other hand, the mobile station only sends a priority ASR-Request when the mobile station detects that its battery power has dropped below the threshold. Further, it should be understood that a priority indicator may take other forms, may be used in other situations, and may be implemented in other ways, without departing from the scope of the invention.

In a further aspect, once a base transceiver station removes a high-congestion sector from the mobile station's active set, the removed high-congestion sector may remain in the mobile station's neighbor set. As such, the mobile station may continue to monitor the pilot power level of the removed sector, and it is entirely possible that the pilot signal strength of the removed sector will continue to be above the $T_{ADD}$ threshold. Therefore, in an exemplary embodiment, to prevent immediately asking the RAN to add that removed sector back into its active set (e.g., by sending PSMM messages to the base transceiver station), the mobile station maintains a removed-sector list, which identifies any high-congestion sectors that have been removed from the active set. The mobile station may then check the removed-sector list before sending a PSMM, so that removed sectors are not included in the PSMM.

The mobile station may keep a sector on the removed-sector list until it receives a message indicating or itself determines that conditions are such that the sector may be added back to the active set (presuming that the signal strength is still above $T_{ADD}$). For example, the mobile station may keep a sector on the removed-sector list until it receives a Reconnect Authorization Message (RCNA-Message) from the RAN. As another example, the mobile station may keep a sector on the removed-sector list until it determines that its battery is recharged to above a threshold level (in the event that the battery power dropping below the threshold triggered method 200), or until it determines the mobile is no longer stationary (in the event method 200 was initiated in response to the mobile station determining it is substantially stationary).

It should be understood that, while method 200 involves the mobile station selecting a single high-congestion sector, it is within the scope of the invention for the mobile station to select and request removal of multiple high-congestion sectors. For example, the mobile station may select two high-congestion sectors (having the first and second highest congestion levels), or three high-congestion sectors (having the first, second, and third highest congestion levels), and so on.

Figure 3:
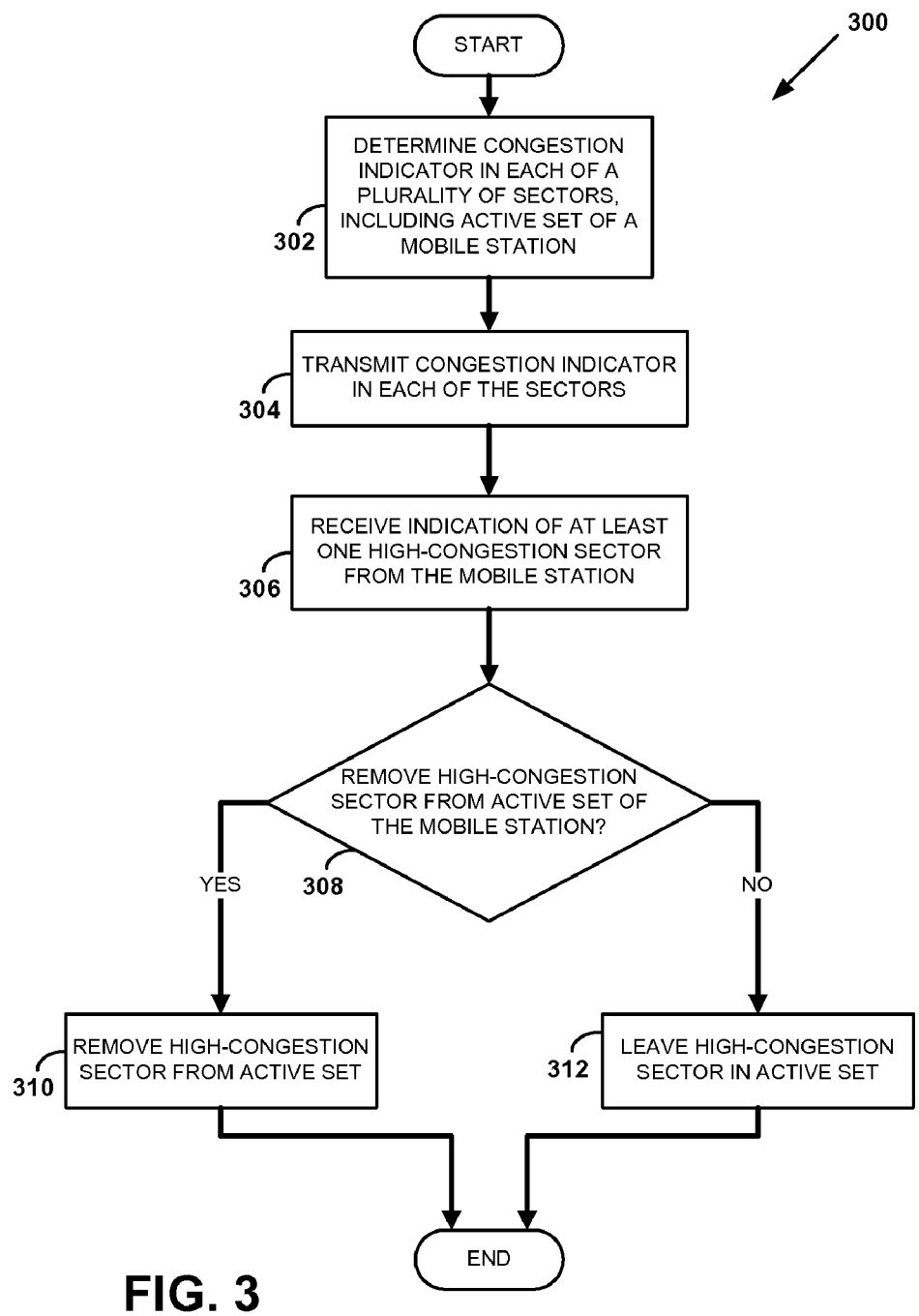
FIG. 3 is another flow chart illustrating a method, according to an exemplary embodiment.

FIG. 3 is a flow chart illustrating a method 300, according to an exemplary embodiment. Method 300 is preferably carried out by one or more entities of a RAN (e.g., one or more BTSs, BSCs, and/or MSCs), which is providing service to a mobile station having a number of active sectors in its active set. The method 300 involves the RAN determining a congestion indicator in each of a plurality of sectors, including the mobile station's active set, as shown by block 302. The RAN then transmits a congestion indicator in each of the sectors, as shown by block 304. Next, the RAN receives an indication of at least one high-congestion sector from the mobile station, as shown by block 306. Importantly, the high-congestion sector is selected for the RAN, by the mobile station. To do so, the mobile station may implement a method such as that illustrated in FIG. 2. The RAN then determines whether to remove the at least one high-congestion sector from the active set of the mobile station, as shown by block 308, and removes the high-congestion sector if so determined, as shown by block 310. Otherwise, the RAN leaves the high-congestion sector in the active set, as shown by block 312.

The RAN may use various techniques to determine a congestion indicator for a given sector, and to provide the congestion indicator to mobile stations operating in the sector. For example, the RAN may determine one or more of: (1) the PCO in an active sector, (2) the Walsh-code usage in the active sector, and (3) the ACO in the active sector. The RAN may than use any of these, alone or in combination with each other, to determine a relative level of congestion. Further, the RAN may use any appropriate indication of the congestion (i.e., traffic level or resource usage) as a congestion indicator.

Furthermore, the RAN may send the congestion indicators to a mobile station using various techniques. For instance, in an exemplary embodiment, a congestion indicator may be periodically provided by the RAN via both the paging channel and the forward-link traffic channels. By periodically broadcasting a congestion indicator in a paging-channel message, the RAN can provide all mobile stations in a sector an indication of the current congestion level via a single broadcast. However, in IS-2000, mobile stations typically do not listen for such messages via the paging channel, during a communication. As such, the RAN may additionally or alternatively provide a mobile station with a congestion indicator via the traffic channel. As one specific example, a base station may include a congestion field in an HDM. The congestion field may be a single congestion bit (used to indicate high or low congestion, for instance), although preferably the congestion field includes a series of bits used to indicate varying degrees of congestion in the sector. Other examples are also possible.

Figure 4A:
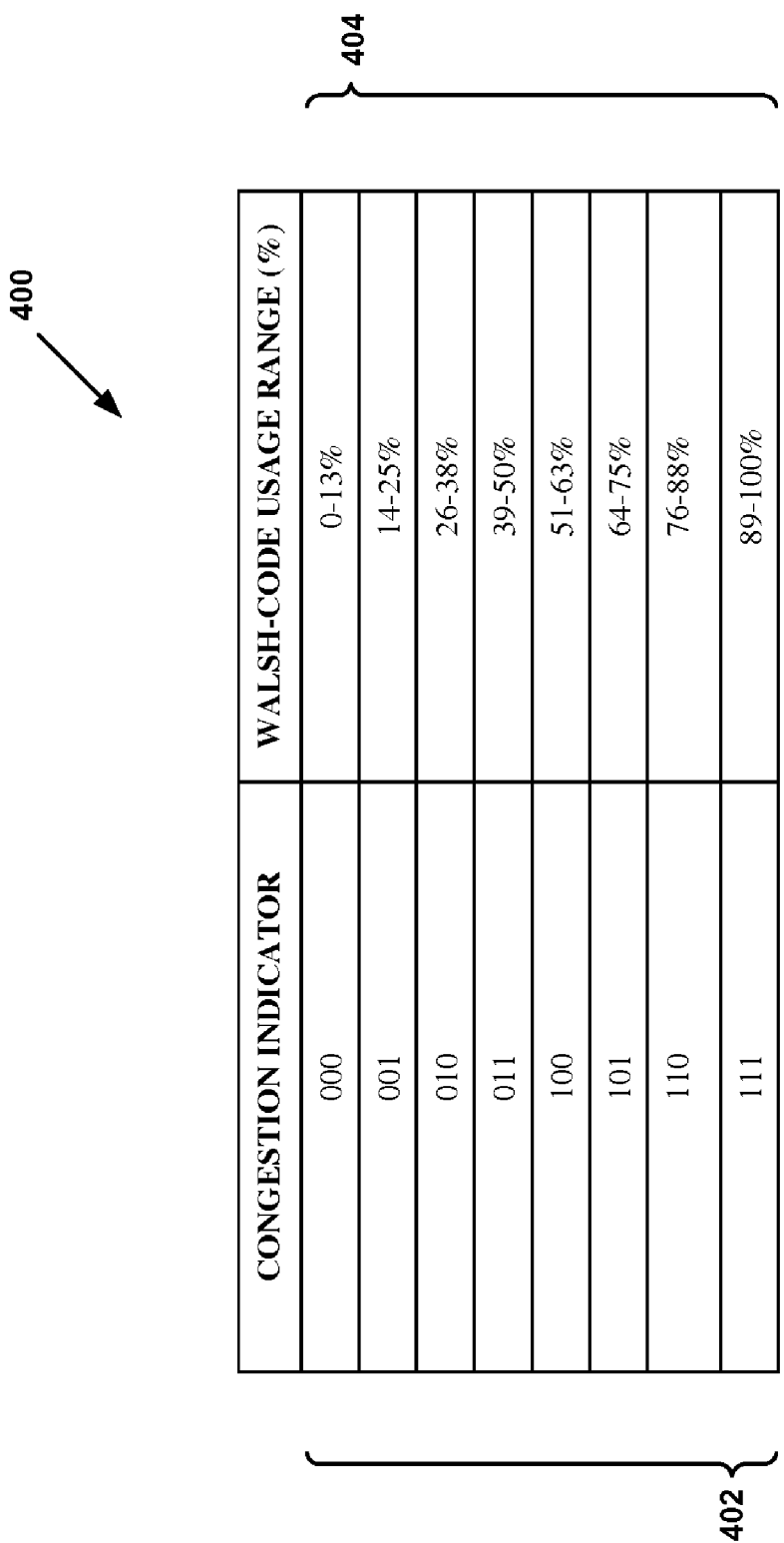
FIG. 4A is a table showing exemplary congestion indicator values when a 3-bit congestion indicator is employed, according to an exemplary embodiment.
Figure 4C:
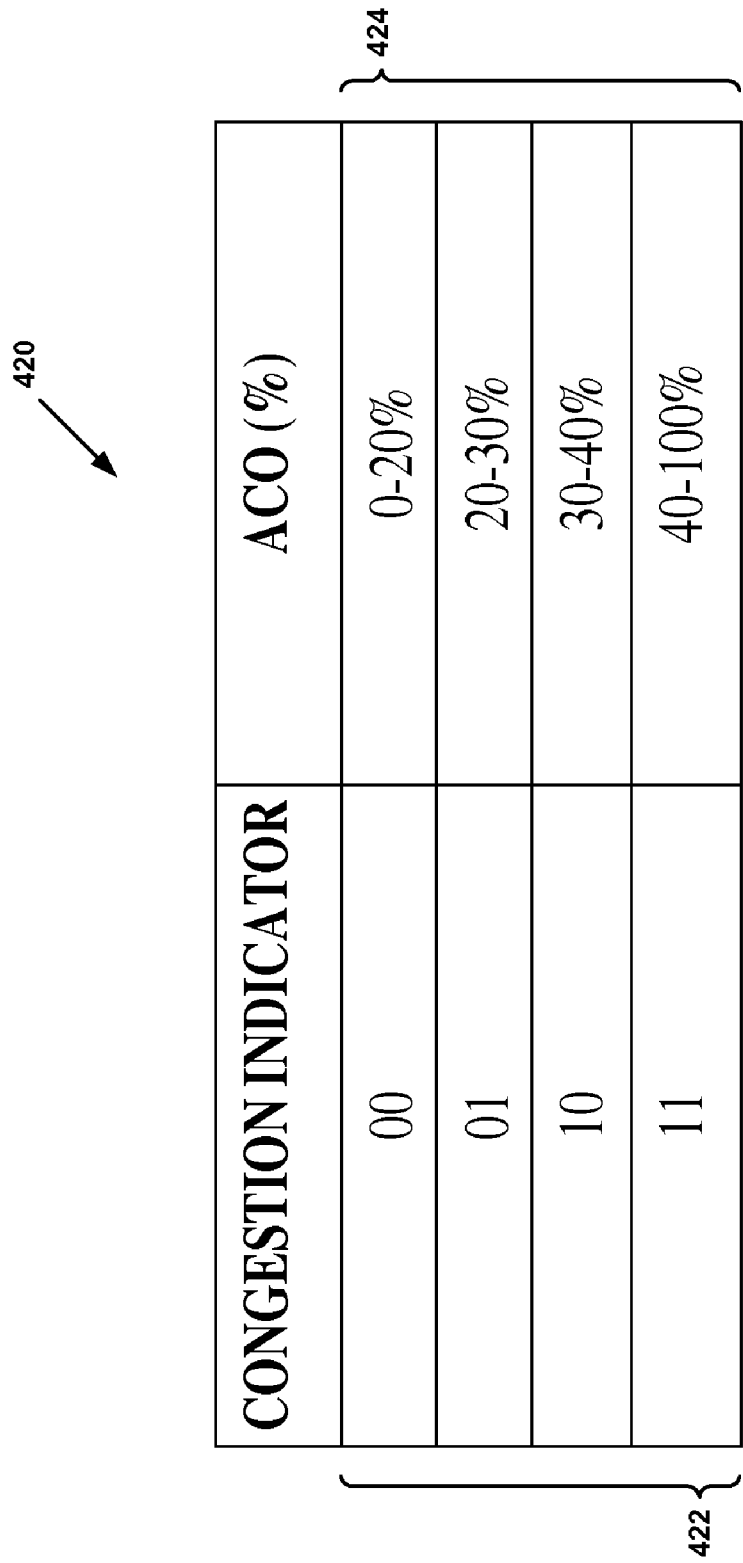
FIG. 4C is another table showing exemplary congestion indicator values when a 2-bit congestion indicator is employed, according to an exemplary embodiment.

As noted, congestion indicators may take various forms. For instance, each congestion indicator may be a single or multiple bits included in an overhead field. For example, FIG. 4A is a table 400 showing exemplary congestion indicator values 402 when a 3-bit congestion indicator is employed. Table 400 shows ranges 402 of congestion as the percentage of Walsh codes in use (i.e., Walsh code usage), and the congestion indicator 402 corresponding to each range. As another example, FIG. 4B is a table 410 showing exemplary congestion indicator values 412 when a 2-bit congestion indicator is employed. Table 410 shows exemplary PCO ranges 414, and the congestion indicator 412 corresponding to each range. And as another example, FIG. 4C is another table 420 showing exemplary congestion indicator values 422 when a 2-bit congestion indicator is employed. Table 420 shows exemplary ACO ranges 424, and the congestion indicator 422 corresponding to each range. It should be understood that the ranges of Walsh code usage percentage, PCO, and ACO are for purposes of example only, and that generally, ranges and corresponding congestion indicators may be selected as a matter of engineering design choice.

It should be understood that the determination of the congestion indicators by a RAN is not necessarily tied to a specific mobile station or its active set. Rather, an exemplary RAN may determine congestion indicators in all its sectors. Thus, determining congestion indicators in the active sectors is inherent in this more general process. Further, congestion indicators may be provided via broadcast to any mobile station operating in a given sector, and in so doing, the RAN may provide congestion indicators in a mobile station's active sectors. As such, the RAN does not necessarily need to positively determine that a particular sector is part of a mobile station's active set, when broadcasting the congestion indicator.

In an exemplary embodiment, the received indication of the high-congestion sector may take the form of, or be included in, an ASR-Request. The ASR-Request preferably includes data identifying the high-congestion sector, and possibly includes other data, such as a priority indicator (e.g., a priority bit).

Once the high-congestion sector is identified for the RAN, the RAN may use various techniques, which may involve evaluating various factors, to determine whether to remove the high-congestion sector from the mobile station's active set. For example, the RAN may compare the congestion level in the high-congestion sector to a threshold level of congestion, and only remove the high-congestion sector from the mobile station's active set only when the congestion in the high-congestion sector is above the threshold. The congestion level used for this analysis be the level as indicated to the mobile station in the congestion indicator. Alternatively, the RAN may use the current level of congestion (i.e., the congestion at or near when the ASR-Request is received from the mobile station).

As another alternative, the RAN may always respond to an ASR-Request by removing the high-congestion sector from the active set, and not engage in any further evaluation of whether or not to do so. Accordingly, a determination of whether or not to remove the high-congestion sector may simply be the determination that an ASR-Request has been received. Therefore, it should be understood that the step of determining whether to remove the at least one high-congestion sector from the active set is inclusive of an embodiment where the RAN necessarily removes the high-congestion sector when an ASR-Request is received.

In a further aspect, in an embodiment where the ASR-Request includes a priority indicator, the RAN may use the priority indicator as a basis for determining whether to remove the at least one high-congestion sector. For example, in an exemplary embodiment, the priority bit may be set to "1" to indicate priority, and set to "0" to indicate non-priority. As such, the RAN always removes the high-congestion sector when the priority bit is set to "1", and only engage in further evaluation of whether or not to remove the high-congestion sector when the priority bit is "0" (such as by comparing the congestion in the high-congestion sector to a threshold level). As an alternative, the threshold level of congestion at which the high-congestion sector will be removed from the active set, may be lowered when the priority bit is set to "1" (meaning less congestion is required in order to remove the high-congestion sector from the active set).

Once it is determined that a high-congestion sector should be removed from a mobile station's active set, the RAN may implement various techniques to effectuate removal. For example, removal can be accomplished by sending the mobile station an HDM that includes a new active set, which does not include the high-congestion sector. Further, the RAN may release the resources (e.g., the channel element and Walsh code) being used for the mobile station in the sector, so that these resources can be made available for use by other mobile stations in the sector. Other techniques are also possible.

In a further aspect, once a sector has been removed from a mobile station's active set, the RAN may, at a later time, determine that the mobile station may add the sector back into its active set. In particular, as a mobile station may be configured to wait for a Reconnect Authorization Message (RCNA-Message), before again considering a removed sector for its active set, the RAN may send an RCNA-Message when it determines conditions are such that the mobile can again connect to the removed sector. As one example, when congestion in the sector falls below the threshold upon which removal was based in the first place, the RAN may send the mobile an RCNA-Message. More generally, the RAN may send an RCNA-Message whenever the condition or conditions upon which removal was based, no longer exist.

In an alternative embodiment, the mobile station may not wait for an RCNA-Message. In such an embodiment, since it is entirely possible that the pilot signal strength of the removed sector will continue to be above the $T_{ADD}$ threshold, the mobile station may keep asking the RAN to add that removed sector back into its active set (e.g., by sending PSMM messages to the base transceiver station). The RAN may use several possible methods to deal with this scenario. For example, to prevent the mobile station from adding the removed sector back to the active set, by denying requests to do so. In particular, the RAN may respond to a PSMM including the removed sector in the active set with an HDM that does not include the removed sector. Alternatively, the base transceiver station may determine (either directly or by use of intermediate processing elements in a wireless network) if the mobile station is stationary or moving, and depending upon this determination, approve or deny the request to add the removed sector back into the active set.

In this regard, the test for moving can be implemented by determining if the mobile station has moved by a substantial amount (configurable parameter, e.g., 100 meters) between the time the sector was removed and the time the PSMM message was received seeking to add the sector back into the active set. If the mobile station is essentially stationary (no substantial movement), then it would be reasonable to assume that the mobile station's RF conditions are not changing substantially. Consequently, the base transceiver station refuses the request to add the sector back into the mobile station's active set. On the other hand, if the mobile station is moving (substantial movement has occurred), then it would be more possible that the mobile station's RF conditions are in fact changing, and so the request to add the sector back into the mobile station's active set is granted.

The RAN may use various techniques to determine whether substantial movement has occurred. For example, the RAN may determine if the round trip delay (RTD) of signals communicated between one or more BTSs and the mobile station has changed sufficiently over time (i.e., by more than a threshold amount). As another example, the RAN may determine whether substantial movement has occurred by considering the GPS location of the mobile station over time, to see if the GPS location changes sufficiently over time. And as another example, the base transceiver station may determine whether substantial movement has occurred by considering whether the location of the mobile station has changed sufficiently over time, with location being determined through well known triangulation mechanisms, e.g., using round trip delay or other measurements from three or more BTSs. Other examples are also possible.

FIG. 5 is another flow chart illustrating a method 500, according to an exemplary embodiment. In method 500, rather than request that the RAN remove a high-congestion sector from its active set, the mobile station leaves the high-congestion sector in its active set, but designates the high-congestion sector as a "transparent" sector, which the mobile station does not scan. Since a mobile station typically scans all its active sectors, pausing (i.e., refraining from searching for a pilot signal) where it would have otherwise scanned a transparent sector, may help to conserve battery power.

More specifically, method 500 involves a mobile station receiving a congestion indicator in each active sector of an active set of the mobile station, as shown by block 502. Further, the mobile station is initially operating in a first scanning mode, wherein operation in the first scanning mode comprises the mobile station scanning all active sectors in an active set of the mobile station. While operating in the first scanning mode, the mobile station makes a determination that the battery power for the mobile station is below a threshold level, as shown in block 504. Then, in response to this determination, the mobile station selects at least one high-congestion sector as a transparent sector, as shown in block 506. The mobile station then begins operating in a second scanning mode, wherein operation in the second scanning mode comprises the mobile station scanning a subset of the sectors in the active set, which excludes transparent sectors, as shown by block 508.

As noted, operating in the second scanning mode may involve scanning only a subset of the sectors in the active set. More specifically, while in the first scanning mode, the mobile station may scan all active sectors, such as by scanning according to IS-2000. For example, a mobile station may scan three active sectors A1-A3, a candidate sector C1, and neighbor sectors N1-N2 in a manner such that active sectors are scanned twice as often as candidate sectors, and candidate sectors are scanned twice as often as neighbor sectors. For instance, the mobile station may repeatedly scan sectors A1-A3, C1, and N1-N2 in the following order: A1, A2, A3, C1, A1, A2, A3, N1, A1, A2, A3, C1, A1, A2, A3, N2. If sector A2 is selected as a transparent sector, when the mobile station switches to the second scanning mode, the mobile station may then pause or rest (i.e., refrain from scanning) when it would have previously scanned sector A2. Accordingly, in the second scanning mode, the mobile station may repeatedly scan sectors A1, A3, C1, and N1-N2 in the following order: A1, pause, A3, C1, A1, pause, A3, N1, A1, pause, A3, C1, A1, pause, A3, N2. Other sequences and scanning techniques are also possible.

In an alternative embodiment, the mobile station may conserve power by reducing the frequency with which it scans transparent sectors, rather than removing them from scanning altogether. For example, referring again to a mobile station having three active sectors A1-A3, a candidate sector C1, and neighbor sectors N1-N2, the mobile station may determine A2 is a transparent sector and cut the frequency with which it scans A2 in half, repeatedly scanning sectors A1-A3, C1, and N1-N2 in the following order: A1, pause, A3, C1, A1, A2, A3, N1, A1, pause, A3, C1, A1, A2, A3, N2. It should be understood that the order in which sectors are scanned, and the reduced frequency with which a transparent sector is scanned, may vary as a matter of engineering design choice.

In a further aspect, an exemplary method may involve detecting certain events or conditions that trigger the mobile station to perform method 500 in order to switch to the second scanning mode. For example, the mobile station may monitor its battery level, and may switch to the second scanning mode, such as by carrying out blocks 504-508, in response to a determination that a mobile-station battery level is below a threshold level, a determination that a mobile station is substantially stationary, or in any other scenario where the mobile station can advantageously reduce power consumption by switching to the second scanning mode. Additional details regarding when a mobile station may switch back and forth between the first and second scanning mode are disclosed in co-owned U.S. patent application Ser. No. 12/724,650 entitled "Selective Scanning of the Active Set", which is incorporated by reference in its entirety herein. The '650 Application involves a mobile station selecting transparent sectors based on the relative signal strengths of the sectors in its active set. Thus, while the impetus and techniques by which transparent sectors are selected differ in the '650 Application, the described functionality regarding the treatment of transparent sectors, once selected, applies equally in the context of the present invention.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
    (a) a mobile station receiving a congestion indicator in each active sector of an active set of the mobile station, wherein the congestion indicators are received from a radio access network (RAN);
    (b) the mobile station using the received congestion indicators as a basis for selecting at least one high-congestion sector from the active set; and
    (c) the mobile station providing an indication of the at least one high-congestion sector to the RAN.

2. The method of claim 1, further comprising:
    the mobile station making a determination that battery power for the mobile station is below a threshold level; and
    the mobile station performing (b)-(c) in response to the determination that the battery power for the mobile station is below the threshold level.

3. The method of claim 1, further comprising:
    the mobile station making a determination that the mobile station is substantially stationary; and
    the mobile station performing (b)-(c) in response to the determination that the mobile station is substantially stationary.

4. The method of claim 1, wherein the mobile station receives the congestion indicator in a handoff direction message (HDM) from the RAN.

5. The method of claim 1, wherein the received congestion indicator for each active sector is based on at least one of: (a) the paging channel occupancy (PCO) in the sector, (b) the access channel occupancy (ACO) in the sector, and (c) Walsh-code usage on forward-link in the sector.

6. The method of claim 1, wherein each received congestion indicator indicates a relative level of congestion in the corresponding active actor, and wherein using the received congestion indicators as a basis for selecting the at least one high-congestion sector from the active set comprises:
    selecting an active sector having the highest relative level of congestion as the at least one high-congestion sector.

7. The method of claim 1, wherein providing an indication of the at least one high-congestion sector to the RAN comprises sending an Active Sector Removal Request (ASR-Request) to the RAN via a reverse-link traffic channel, wherein the ASR-Request identifies the at least one high-congestion sector.

8. The method of claim 7, wherein the ASR-Request further comprises a priority indicator.

9. The method of claim 7, wherein the ASR-Request is sent in response to a determination that a battery level of the mobile station has dropped below a threshold level.

10. The method of claim 1, further comprising, the mobile station refraining from adding the at least one high-congestion sector back into the active set until the mobile station receives a Reconnect Authorization Message (RCNA-Message) from the RAN identifying the high-congestion sector.

11. A method comprising:
    (a) a radio access network (RAN) transmitting a congestion indicator in each of a plurality of sectors, wherein the plurality of sectors includes one or more active sectors from an active set of a mobile station;
    (b) the RAN receiving from the mobile station, an indication of at least one high-congestion sector from the active set, wherein the at least one high-congestion sector has been selected based at least in part on the congestion indicators in the active sectors; and
    (c) the RAN determining whether to remove the at least one high-congestion sector from the active set.

12. The method of claim 11, further comprising the RAN initially determining the congestion indicator in each of the plurality of sectors.

13. The method of claim 12, wherein determining the congestion indicator in each of the plurality of sectors comprises:
    using at least one of: (a) the paging channel occupancy (PCO) in the sector, (b) the access channel occupancy (ACO) in the sector, and (c) Walsh-code usage on forward-link in the sector, as a basis for determining the congestion indicator in the sector.

14. The method of claim 11, wherein the RAN receives the indication of the at least one high-congestion sector in an Active Sector Removal Request (ASR-Request) from the mobile station.

15. The method of claim 11, wherein determining whether to remove the at least one high-congestion sector from the active set comprises:
   comparing a congestion level in the high-congestion sector to a threshold level of congestion; and
   if the congestion level in the high-congestion sector is greater than the threshold level, then removing the high-congestion sector from the active set.

16. The method of claim 11, wherein determining whether to remove the at least one high-congestion sector from the active set comprises:
   automatically removing the high-congestion sector from the active set in response to receiving the indication of at least one high-congestion sector.

17. A system comprising:
   a tangible computer-readable medium; and
   program instructions stored in the tangible computer-readable medium that, when executed by a processor, cause a mobile station to:
   (a) receive a congestion indicator in each active sector of an active set of the mobile station, wherein the congestion indicators are received from a radio access network (RAN);
   (b) use the received congestion indicators as a basis to select at least one high-congestion sector from the active set; and
   (c) provide an indication of the at least one high-congestion sector to the RAN.

18. The system of claim 17, further comprising program instructions stored in the tangible computer-readable medium that, when executed by a processor, cause a mobile station to:
   make a determination that battery power of the mobile station is below a threshold level; and
   perform (b)-(c) in response to the determination that the battery power of the mobile station is below the threshold level.

19. The method of claim 17, wherein the indication of the at least one high-congestion comprises an Active Sector Removal Request (ASR-Request) that is provided to the RAN via a reverse-link traffic channel, wherein the ASR-Request identifies the at least one high-congestion sector and includes a priority indicator.

20. A method comprising:
   (a) a mobile station initially operating in a first scanning mode, wherein operation in the first scanning mode comprises the mobile station scanning all active sectors in an active set of the mobile station;
   (b) a mobile station receiving a congestion indicator for each active sector in an active set of the mobile station, wherein the congestion indicators are received from a radio access network (RAN), and wherein each received congestion indicator indicates a level of congestion in the corresponding active actor;
   (c) the mobile station selecting at least one high-congestion sector as a transparent sector, the selected high-congestion sector having the highest level of congestion relative to the other active sectors; and
   (d) the mobile station operating in a second scanning mode, wherein operation in the second scanning mode comprises the mobile station scanning a subset of the sectors in the active set, wherein the subset excludes the at least one high congestion sector that is selected as a transparent sector.

* * * * *